Figure 2:
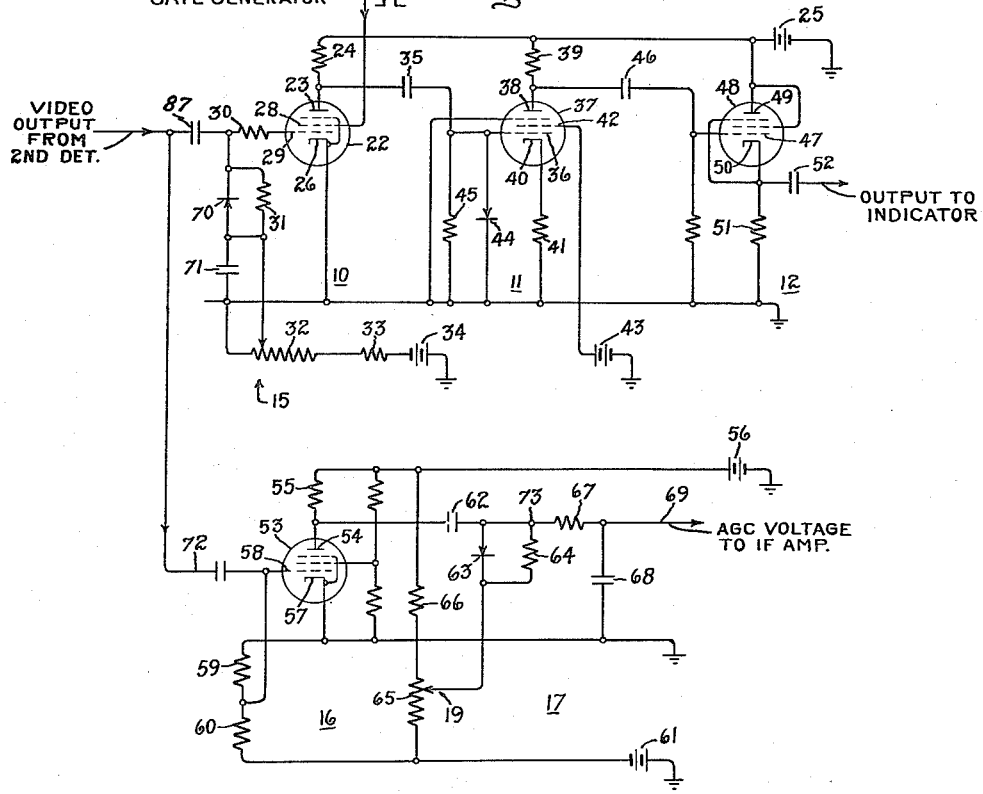

May 22, 1956 S. M. KAPLAN 2,747,179
AUTOMATIC AMPLITUDE SELECTION CIRCUIT
Filed Dec. 28, 1950 2 Sheets-Sheet 1
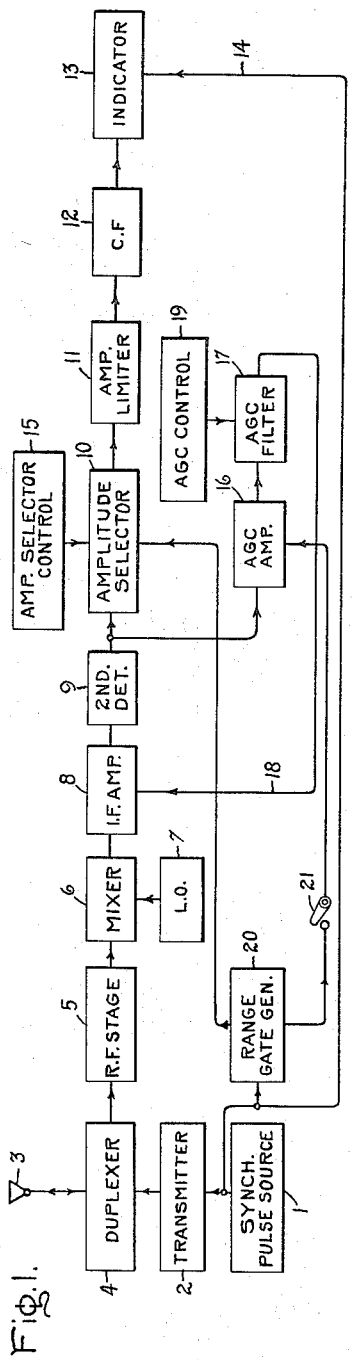
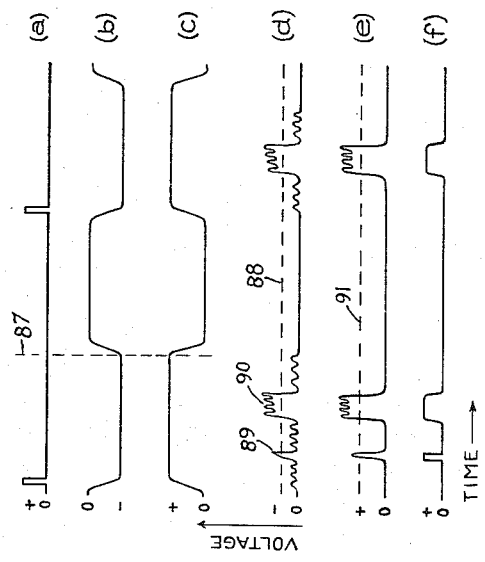
Inventor:
Sidney. M. Kaplan,
by Merton D Morse
His Attorney.

Inventor:
Sidney. M. Kaplan,
by Merton D Morse
His Attorney.

United States Patent Office 2,747,179
Patented May 22, 1956

2,747,179

AUTOMATIC AMPLITUDE SELECTION CIRCUIT

Sidney M. Kaplan, Schenectady, N. Y., assignor to General Electric Company, a corporation of New York Application December 28, 1950, Serial No. 203,079

7 Claims. (Cl. 343—17.1)

This invention relates to receivers and particularly to discriminating between desired and undesired electrical signals passing through a receiver.

In obstacle detection systems of the radar type, it is desirable that the radar operator monitoring an indicator displaying detected objects be not troubled with false object indications due to noise generated in the receiver. That is, it is desirable to keep the frequency of occurrence of undesired noise pulses in the display presented for his study at a minimum. Since the received pulses corresponding to detected objects are ordinarily of larger amplitude than the noise pulses, discrimination between true objects pulses and noise pulses may be made on an amplitude basis. However, there occurs a region in which the maximum amplitude noise pulses approach the minimum amplitude of useful pulses due to detected obstacles. Thus, a compromise must be made in which a certain amount of undesired noise pulses are passed through the receiver to the target display indicator. To accomplish this, a circuit must be provided for controlling the number of noise pulses which pass from the radar receiver to an indicator. The feasibility of an amplitude selection system for accomplishing this purpose is at once apparent. It can be shown mathematically that the fraction of time during which noise pulses exceed a given threshold level in the receiver could be made quite small if certain ratios of receiver threshold level to root mean square noise level are maintained. The advantages in a radar detection system employing this feature is that the signals passing through the receiver provide a display on the screen of a cathode ray tube indicator which is substantially dark for the most part except for target signals. This permits rapid evaluation of detected objects with a minimum of operator fatigue.

Accordingly, it is an object of my invention to provide an arrangement for automatically discriminating between desired and undesired signals.

It is another object of my invention to provide an arrangement permitting only a predetermined minimum of undesired signals to pass through a receiver.

Another object of my invention is to provide an improved automatic amplitude selector for received radar pulses.

It is another object of my invention to provide a combined amplitude selector and automatic gain control circuit for a pulse receiver.

It is another object of my invention to provide a radar receiver resulting in an improved radar presentation.

It is another object of my invention to provide apparatus maintaining a substantially constant ratio of threshold level to R. M. S. noise level in a radar receiver.

It is another object of my invention to provide apparatus for maintaining a substantially constant frequency of occurrence of undesired noise pulses at the output of the receiver.

Briefly, my invention comprises connecting the video output of the intermedaite frequency stage of a radar receiver to an amplitude selector circuit which passes only those signals which exceed a preset amplitude level. This level is adjusted so that the false alarm time, that is the average time interval between the appearance of false object indications due to receiver noise is large. In one embodiment this is established at once every several thousand pulse transmissions. Specifically, a range gating circuit gates the amplitude selector circuit so that only those targets which are at a usable range are passed. This has the effect of reducing the number of false targets appearing on the target indicator. An automatic gain control circuit operates to maintain a constant noise level at the input to the amplitude selector circuit thus maintaining a stable false alarm time.

Figure 4:
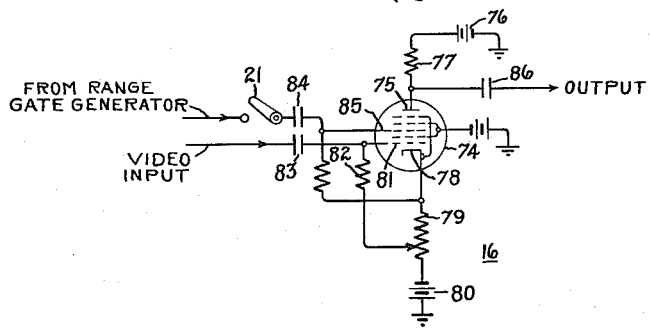

The features which are believed to be characteristic of my invention are set forth with particularity in the appended claims. My invention itself, however, together with further objects and advantages thereof, can best be understood by reference to the following description taken in connection with the accompanying drawings in which Fig. 1 illustrates in block diagram form an embodiment for carrying out the invention; Fig. 2 is a schematic circuit diagram of an automatic amplitude selector and gain control circuit for a radar receiver; Fig. 3 illustrates graphically the manner in which received signals are processed in passing through the amplitude selector circuit of Fig. 2 and Fig. 4 is a circuit diagram of another embodiment of the automatic gain control circuit shown in Fig. 1.

Referring to Fig. 1 there is shown in block diagram form an obstacle detection system employing the invention. Synchronizing pulses from source 1 cause transmitter 2 to transmit radar pulses of electromagnetic energy periodically over the directive antenna 3 toward remote objects to be detected. The duplexer 4 operates in a well known manner to channel transmitted pulses to the antenna 3, and pulse echoes reflected from the object and received by the antenna to the radio frequency amplifier stage 5 comprising the radar receiver. The received pulses from 5 are mixed in the mixer circuit 6 with the waves from the local oscillator 7 to yield signals at an intermediate frequency. The pulse echoes at the intermediate frequency are then applied through the intermediate frequency amplifier 8 to the second detector 9. The output of the second detector thus comprises detected undesired noise signals generated in the preceding receiver stages superimposed on the desired pulse echoes. The output of the second detector 9 is then applied through the amplitude selector 10, the amplifier limiter 11, and the cathode follower 12 to the indicator 13 for display purposes. Indicator 13 may comprise a cathode ray tube operating in a conventional manner to display the received pulse echoes in spaced position on the screen of the cathode ray tube in accordance with the range of the objects from which the pulse echoes have been received. Briefly, the cathode ray tube indicator comprises a deflection circuit for periodically sweeping the cathode ray across a screen in time synchronizing pulses from source 1 and available over lead 14. The output of the cathode follower 12 is applied to an intensity modulating grid of the cathode ray tube for providing a mark along the cathode ray sweep corresponding to the position of the object or target from which the pulse echoes were received. In order to provide a pulse echo display on the screen on the cathode ray tube indicator which is substantially dark for the most part except when target signals are received, it becomes necessary to provide an arrangement for rejecting spurious noise signals which are superimposed on the target signals available at the output of the second detector 9.

As previously mentioned, the fraction of time during which noise signals will exceed a given threshold level can be made quite small if the ratio of threshold level to root mean square noise level in a receiver is maintained constant. In order to establish a fixed threshold level for received signals, amplitude selector 10 and amplifier limiter 11 are provided. The amplitude selector 10 operates to pass only signals about a given amplitude level established by the amplitude selector control 15 to the amplifier limiter 11. The amplifier limiter 11 then clips the selected signals above a given amplitude level before they are passed through the cathode follower to the indicator. This arrangement insures that only the received signals which exceed the established threshold level are applied to the indicator 13 for display purposes.

For maintaining the root mean square noise level at the input to the amplitude selector 10 constant, circuits 16 and 17 are provided. The output of the second detector, comprising both noise and useful target signals, is applied through the automatic gain control amplifier circuit 16 to the automatic gain control filter 17 to yield a gain control voltage having an amplitude corresponding to the average amplitude of the signals at the output of the second detector.

In the case of random noise, it can be proven that statistically the average noise level is proportional to the root mean square noise level. Since the noise signals are substantially continuous whereas the pulse echoes only occur periodically, the gain control voltage is substantially representative of the noise level. This control voltage, available at the output of 17, is then applied over lead 18 to the intermediate frequency amplifier stages 8 for controlling the gain thereof. This control action provides a substantially constant root mean square noise level at the input of amplitude selector 10. A control circuit 19 is provided for establishing a desired noise level at the output of the second detector.

Range gate generator 20, which may comprise a single shot multivibrator, is provided for operating the amplitude selector circuit 10 so that only those detected signals which occur at a time corresponding to the usable range of the radar equipment may be passed to the indicator. This has the effect of reducing the number of false object displays or noise signals appearing on the indicator.

The range gate generator 20 is shown synchronized with the pulses from source 1. By closing switch 21, it is possible to modify the operation of the automatic gain control amplifier 16 such that instead of being continuously operative to generate a gain control voltage, it may be rendered operative only at a time after each transmitted pulse corresponding to a range in excess of the maximum range of the equipment. Since this normally corresponds to a time when pulse echoes are not being received, a gain control voltage is derived which is more closely representative of the noise level at the output of the detector. In this latter modification, the two outputs of opposite polarity available from the single shot multivibrator comprising the range gate generator may be employed to render the amplitude selector 10 and the automatic gain control amplifier 16 operative during the proper time intervals.

Referring to Fig. 2, the nature of the amplitude selection and gain control circuits shown in Fig. 1 are indicated in circuit diagram form. The amplitude selector circuit 10 comprises an electron discharge device 22 having its anode 23 connected through the loading resistor 24 to the positive unidirectional potential source 25 and its cathode 26 connected directly to ground. Positive going pulses indicated in Fig. 2 at 27 from the range gate generator 20, shown in Fig. 1, are applied to the screen grid 28 for rendering device 22 operative to pass signals applied to grid 29 which are above a given amplitude. Bias for the control grid 29 is established through resistors 30, 31, potentiometer 32, resistor 33 and the negative unidirectional potential source 34.

The output of the amplitude selector 10 available at the anode 23 is supplied through the coupling condenser 35 to the control grid 36 of the electron discharge device 37. Device 37 has its anode 38 connected through the loading resistor 39 to the positive unidirectional potential 25, and its cathode 40 connected through the loading resistor 41 to ground. The screen grid 42 is connected to the source of positive unidirectional potential 43. Diode 44 is connected across the grid resistor 45 between the control grid 36 and ground to prevent the grid 36 from being driven positive, thus providing a stable reference for the limiting action.

The output of device 37 available at the anode 38 is applied through the coupling condenser 46 to the control grid 47 of device 48 operating as a cathode follower. The anode 49 of the device 48 is connected to the source 25 and the cathode 50 is connected to ground through the loading resistor 51. The output of the cathode follower is developed across resistor 51, and applied over condenser 52 to subsequent stages, as for example, the indicator 13 shown in Fig. 1.

The automatic gain control amplifier circuit 16 comprises an electron discharge device 53 having its anode 54 connected through the loading resistor 55 to a positive unidirectional potential source 56 and its cathode 57 connected directly to ground. Device 53 is normally held non-conductive because its control grid 58 is connected to the midpoint of the voltage dividing resistors 59 and 60 serially connected between ground and the negative unidirectional potential source 61. The output of device 53 developed at the anode 54 is applied through the coupling condenser 62 to the automatic gain control filter circuit 17.

Circuit 17 comprises a diode 63 and resistor 64 operating as a clamping circuit. The clamping level of this circuit is adjusted by means of the tap on potentiometer 65. Potentiometer 65 and resistor 66 are serially connected between the sources of positive and negative unidirectional potential sources 56 and 61 respectively. A filter network comprising resistor 67 and condenser 68 is provided to remove the alternating component of the voltage leaving the gain control circuit, thereby leaving only a unidirectional voltage being developed across the condenser 68. This voltage, available over lead 69, is then applied to the control grids of the electron discharge devices forming the intermediate frequency amplifier stages 8 of Fig. 1 for maintaining a constant noise level output.

The manner in which the received signals are processed in passing through the circuits shown in Fig. 2 will now be explained.

The signals received by the antenna shown in Fig. 1, are amplified in the radio frequency and the intermediate frequency amplifying stages before being made available at the output of the detector 9. The signals applied to the amplitude selector circuit 10 comprise the positive range gate pulses from range gate generator 20 in Fig. 1 and the positive going object signals and noise pulses from detector 9. The range gate pulses are applied to grid 28 of device 22. It should be remembered that these pulses are synchronized with the synchronizing pulses operating the transmitter and have a duration between transmitted pulses corresponding to the usable range of the radar equipment. The target and noise signals are applied over resistor 30 to grid 29 of device 22, operating as a biased amplifier. Device 22 passes only those signals applied to grid 29 which occur during the duration of the positive range gate pulse applied to grid 28 and which drive the grid 29 above the cut off level. The cut off bias on device 22 is adjusted by means of the movable tap on potentiometer 32 so that noise pulses will appear infrequently on the indicator 13 shown in Fig. 1. By way of example, in one embodiment this bias voltage was established such that device 22 was cut off by approximately six times the root mean square noise voltage available from the second detector. Thus only applied signals exceeding six times the root mean square noise voltage caused the amplifier 22 to conduct. In the same embodiment, this resulted in noise signals exceeding this amplitude on the average of only once in each five minute interval.

Diode 70 is connected in parallel with the grid resistor 31 to return condenser 87 to its initial condition if it should acquire a charge because of grid current flow from device 22.

The applied signals which are sufficiently large to cause device 22 to conduct appear at the anode 23 as negative pulses. These signals are coupled through condenser 35 to the control grid 36 of the device 37 operating as a pentode amplifier. The signals are further amplified in this stage and appear as positive going pulses at the anode 38. This stage also acts as a limiter since very large signals drive the grid 36 below cut off. Diode 44 is connected across the grid resistor 45 between the control grid 36 and ground to prevent the grid from being driven positive, thus providing a stable reference for the limiting action. The output of this amplifier, available at the anode 38, is applied over condenser 46 to the control grid 47 of the cathode follower which yields an output across the resistor 51. This output is then applied to the indicator 13 shown in Fig. 1.

The automatic gain control circuit 16 is utilized to maintain a constant noise level at the input to the amplitude selector 10, thus stabilizing the amplitude selection action and the false alarm time against fluctuations in the receiver system. The automatic gain control circuit has the receiver noise and target signals available at the output of the detector 9 applied over coupling condenser 72 to the control grid 58. The automatic gain control circuit thus develops a negative going voltage at its anode 54 approximately proportional to the root mean square noise voltage at the input to the amplitude selector circuit 10. The negative pulses appearing at the anode of device 53 are coupled over condenser 62 to the clamping circuit consisting of diode 63 and resistor 64. The signals at junction 73 appear as negative pulses below the clamping level established by the movable top on potentiometer 65. The filter network, comprising resistor 67 and condenser 68, removes the alternating component of the voltage developed at junction 73 leaving a unidirectional potential across condenser 68. The difference between this unidirectional potential and the clamping level is the average value of the amplified video signals since target signals occur infrequently whereas noise signals are present continuously. The voltage across condenser 68 is thus approximately proportional to the root mean square noise voltage at the input to the amplitude selector 10. This voltage is then applied as a gain control bias on the preamplifier stages comprising the intermediate frequency amplifier 8. Thus if the noise level at the output of detector 9 changes, the bias voltage developed across condenser 68 changes, and the receiver gain is adjusted in a direction to compensate for the change in noise level.

By maintaining a constant ratio of threshold level, to root mean square noise level at the input to device 22, a substantially constant frequency of occurrence of noise pulses is obtained. This insures a substantially clear indication on the screen of the cathode ray tube wherein substantially only signals due to detected objects illuminate the screen of the indicator 13. It is necessary to average the noise at the output of detector 9, since the threshold level is set originally to exclude signals at a statistically determined value. To operate on the peaks of the noise would nullify the statistical approach to eliminating noise.

Fig. 4 illustrates in circuit diagram form a modification of the automatic gain control circuit amplifier 16 shown in Fig. 2. Device 74 comprises an anode 75 connected to the positive unidirectional potential source 76 by the load resistor 77, and its cathode 78 connected through the potentiometer 79 to a negative unidirectional potential source 80. The first control grid 81 has a negative bias, established by resistor 82 and the movable tap on potentiometer 79, applied to it. This maintains device 74 normally in a cut off position such that video signals from the detector 9, applied over condenser 83 to the control grid 81, are usable to pass through the device 74. However, upon closing switch 21, positive going range gate signals from generator 20, shown in Fig. 1, and corresponding to a time interval between pulse transmissions beyond the usable range of the radar equipment where targets are not being observed, are applied over condenser 84 to the control grid 85 to cause an amplified version of the video input signals available at control grid 81 to be developed at the anode 75. The resultant signals available at the anode 75 are then applied over the coupling condenser 86 to the automatic gain control filter circuit 11 of Fig. 2.

Referring to Fig. 3, the amplitude of certain signals encountered in the circuit arrangements of Figs. 2 and 4 is plotted versus time. Graph $a$ illustrates the synchronizing pules available from source 1 which determine the time of transmission of the radar pulses to a remote object. Graph $b$ indicates the range gate pulses whose positive going portions permit passage of the output of detector 9 through the automatic gain control amplifier 16. It should be noted that the positive going portions of this wave occur beyond the time 87 corresponding to the maximum usable range of the radar equipment. Graph $c$ indicates the range gate pulses, whose positive going portions occur within the usable range of the radar equipment and are employed to permit passage of the output of detector 9 through the amplitude selector 10 to the indicator 13 for display purposes. Graph $d$ indicates the output of detector 9 applied to the control grid 29 of the amplitude selector 10. Dotted line 88 indicates the bias level established at the control grid 29 of device 22 by the tap on potentiometer 32 such that only the larger amplitude signals 89 and 90, corresponding to desired target signals, are permitted to pass through amplifier 10 during the positive going range gate portion of graph $c$. Graph $e$ indicates the amplified output of amplitude selector 10 with dotted line 91 indicating the limiting level established by limiter 11. Thus positive going target signals 89 and 90 which are the only signals passing through selector 10 are clipped above level 91 such that the constant amplitude pulses of graph $f$ are the only ones applied to the indicator 13.

It should be noted that only the positive portions of the range gate shown in graphs $b$ and $c$ are effective in causing amplitude selector 10 and amplifier 16 to operate and apply video signals to the succeeding stages. The positive going portion of graph $b$ occurs at a time after each transmitted pulse corresponding to a range in excess of the maximum usable range of the equipment. Thus substantially only the noise signals are sampled during the time between pulse transmissions to provide the automatic gain control voltage. Objects signals are thereby substantially eliminated from effecting the gain control output.

While a specific embodiment has been shown and described, it will be understood that various modifications may be made and developed departing from the invention. The appended claims are therefore intended to cover any such modifications within the true spirit and scope of the invention.

What I claim as new and desire to secure by Letters Patent of the United States is:

1. In combination, means to transmit recurrent pulses of electromagnetic energy toward remote objects, means to receive corresponding pulses from said remote objects after each transmitted pulse at times corresponding to the distance to the respective objects, said receiving means being sensitive to undesired noise pulses, means responsive to noise pulses received in said receiving means at a time after each transmitted pulse and after the occurrence of said corresponding received pulses to produce a voltage proportional to the average magnitude of said last named noise pulses, means to control the sensitivity of said receiving means in accordance with said voltage, means for selecting received pulses above a predetermined amplitude, means for amplitude clipping said selected pulses above a second predetermined amplitude, and means for utilizing said clipped pulses.

2. The combination, in a receiver for receiving substantially continuous undesired noise signals superimposed on recurrent desired signals of relatively larger amplitude, of means responsive to the average magnitude of said received signals for controlling the amplification of said signals to maintain a substantially constant noise output, and means for selecting amplified signals above a predetermined amplitude, whereby the larger amplitude desired signals are substantially separated from the relatively smaller magnitude noise signals.

3. An amplitude selection and automatic gain control circuit for a receiver of noise signals superimposed on desired signals comprising means for recurrently sampling the output of said receiver during periods when substantially only noise signals are being received, means for recurrently adjusting the gain of said receiver in accordance with the average amplitude of said sampled outputs for the reception of said desired signals, means for sampling the output of said receiver during periods when substantially only desired signals are being received, means for selecting only the last-mentioned signals having an amplitude above a predetermined amplitude, means for clipping said selected signals above a second predetermined amplitude, and means for utilizing said clipped signals.

4. In combination means to transmit recurrent pulses of electromagnetic energy toward remote objects, means to receive corresponding pulses from said remote objects after each transmitted pulse at times corresponding to the distance of respective ones of said objects, said receiving means being sensitive to undesired noise pulses of relatively smaller amplitude, means responsive to the pulses in the output of said receiving means at a time between successively transmitted pulses when substantially only noise pulses are being received to produce a voltage corresponding to the average magnitude of said last named pulses, means to control the sensitivity of said receiving means in accordance with said voltage, means, operative solely during a time between successively transmitted pulses when pulses from said objects are being received, for selecting pulses from the output of said receiver above a predetermined amplitude, whereby large amplitude pulses received from said objects are substantially separated from the relatively smaller amplitude noise pulses, and means for utilizing said selected pulses.

5. The combination, in a receiver for receiving substantially continuous undesired noise pulses superimposed on recurrent desired pulses of relatively greater amplitude, of means responsive to the average amplitude of said received pulses for controlling the gain of said receiver to maintain the noise output of said receiver substantially constant, means for selecting said desired pulses greater than a predetermined amplitude after having undergone gain control action in said receiver, whereby the ratio of said predetermined amplitude to the amplitude of said noise pulses is maintained substantially constant such that said desired pulses are substantially separated from said undesired pulses.

6. The combination, of a receiver for receiving substantially continuous undesired noise pulses superimposed on recurrent desired pulses of relatively greater amplitude, of means responsive to the average amplitude of pulses received during a time interval when substantially only noise pulses are being received for controlling the gain of said receiver to maintain the noise output of said receiver substantially constant, and means for selecting said desired pulses greater than a predetermined amplitude at the output of said receiver during a time interval when said desired pulses are being received, whereby the ratio of said predetermined amplitude to the amplitude of said noise pulses is maintained substantially constant thereby substantially separating said desired pulses from said undesired pulses.

7. A control circuit for a receiver of combined, undesired noise signals and desired signals comprising means for maintaining a predetermined ratio of receiver threshold level to root mean square noise level constant, said means comprising means for deriving an average amplitude of said received pulses and signals, means for controlling the gain of said receiver in accordance with the value of said derived signals to maintain the receiver noise output constant, and means for selecting only those signals at the output of said receiver having an amplitude above a predetermined level.

References Cited in the file of this patent
UNITED STATES PATENTS

| | | |
|---|---|---|
| 2,392,546 | Peterson | Jan. 8, 1946 |
| 2,542,032 | Isbister et al. | Feb. 20, 1951 |
| 2,579,497 | Isbister | Dec. 25, 1951 |